United States Patent [19]

Kondo et al.

[11] Patent Number: 4,642,005
[45] Date of Patent: Feb. 10, 1987

[54] HOLDER FOR ROTARY CUTTING TOOLS

[75] Inventors: Kunio Kondo; Katutoshi Haga; Minoru Haga; Yasuo Kato; Shinobu Kaneko, all of Toyota, Japan

[73] Assignees: Fuji Seiko Limited; Toyota Jidosha Kabushiki Kaisha, both of Aichi, Japan

[21] Appl. No.: 647,889

[22] Filed: Sep. 6, 1984

[30] Foreign Application Priority Data

Sep. 14, 1983 [JP] Japan .................. 58-170456

[51] Int. Cl.⁴ ................................. B23C 5/26
[52] U.S. Cl. ........................ 409/232; 408/56; 408/130; 408/147; 408/239 R; 409/234
[58] Field of Search ............ 408/56, 57, 59, 129, 408/130, 131, 146, 186, 190, 191, 193, 198, 238, 239 R, 235 A, 147, 187, 159, 180; 409/231, 232, 233, 234

[56] References Cited

U.S. PATENT DOCUMENTS

| | | | |
|---|---|---|---|
| 2,750,816 | 6/1956 | Mott | 408/130 X |
| 3,138,997 | 6/1964 | Bruckner | 409/233 |
| 3,200,426 | 8/1965 | Barr | 408/130 X |
| 3,296,898 | 1/1967 | Osborn, Jr. | 408/159 X |
| 3,347,115 | 10/1967 | Koch | 408/146 X |
| 3,407,703 | 10/1968 | Guidi et al. | 409/191 |
| 3,477,340 | 11/1969 | Faugli et al. | 409/232 X |
| 3,552,757 | 1/1971 | Salters | 408/198 X |
| 3,677,560 | 7/1972 | Clarkson | 409/232 X |
| 3,753,624 | 8/1973 | Walker et al. | 408/159 |
| 4,066,380 | 1/1978 | Beck et al. | 408/131 X |
| 4,072,083 | 2/1978 | Cesal | 409/232 |
| 4,299,294 | 11/1981 | Womack | 408/130 X |
| 4,396,320 | 8/1983 | Bellman et al. | 408/159 X |
| 4,451,185 | 5/1984 | Yamakage | 408/180 X |

FOREIGN PATENT DOCUMENTS

| | | | |
|---|---|---|---|
| 55-15946 | 4/1980 | Japan | 408/56 |
| 0107835 | 6/1984 | Japan | 409/232 |

Primary Examiner—Gil Weidenfeld
Assistant Examiner—Glenn L. Webb
Attorney, Agent, or Firm—Parkhurst & Oliff

[57] ABSTRACT

A tool holder for holding a rotary cutting tool, attachable to a spindle of a machine tool, has a holder body fixed to the machine spindle. A rotatable shaft having a tool-mounting portion is coupled to the holder body such that the shaft is axially and radially displaceable relative to the holder body. A positioning member is fixedly disposed on the machine tool body radially outwardly of the machine spindle. A casing is disposed radially outwardly of the rotatable shaft such that the casing and the rotatable shaft are rotatable relative to each other, the casing being engageable with the positioning member to accurately position the rotatable shaft when the holder body is fixed to the machine spindle. A guide bushing is fixedly supported at one axial end portion of the casing remote from the holder body. The guide bushing has a bore which is engageable with an outer circumferential surface of a guide portion of the cutting tool held by the tool-mounting portion of the rotatable shaft, thereby rotatably guiding the cutting tool.

16 Claims, 2 Drawing Figures

HOLDER FOR ROTARY CUTTING TOOLS

BACKGROUND OF THE INVENTION

The present invention relates generally to a cutter holder attached to a spindle of a machine tool for supporting a cutting tool rotated by the spindle. More particularly, the invention is concerned with such a holder for a rotary cutting tool, which causes minimum decrease in accuracy of machining by the tool due to a positioning error of the holder with respect to the machine spindle.

Various tool holders have been used for mounting drills, milling cutters, reamers, boring bars and other rotary cutting tools on spindles of machine tools such as drilling, milling and boring machines, and machining centers which are capable of automatically performing multiple kinds of cutting operations. Such a tool holder supports a tool at its one end portion, and is adapted to be removably fixed to the machine spindle at the other end portion.

However, contact or positioning surfaces of the tool holder and the machine spindle are liable to wear due to frequent mounting and dismounting of the tool holder on and from the machine spindle. Further, these tapered surfaces are subject to cutting chips, dust and dirt, and other foreign matters. As a result, the tool holder does not always make a sufficiently snug fit in the spindle bore. Thus, it has been difficult or impossible to avoid a positioning error of the tool holder due to misalignment or inclination of its centerline with respect to the centerline of the spindle. This positioning error or misalignment of the tool holder results in an increase in run-out of a rotary cutting tool at the free end of the tool holder, and consequently leads to machining errors such as an oversize of a bore diameter to be cut by the tool. That is, the positioning error of the tool holder lowers the accuracy of machining with the tool.

The above indicated positioning error of a tool holder will give rise to a serious trouble, particularly in fine-boring, reaming and other machining operations which require a relatively high accuracy.

In the light of the above problem, the inventors of the present application and their co-worker proposed, in the pending patent application Ser. No. 625,960 filed June 29, 1984 (assigned to the assignees of the present application), a tool holder for a rotary cutting tool which is capable of preventing a decrease in machining accuracy due to a positioning error of the tool holder with respect to a machine spindle. This tool holder has a holder body fixed to the machine spindle, and a rotatable shaft disposed concentrically with the holder body and having a tool mounting portion at its one end. The rotatable shaft is coupled at its other end portion to the holder body for receiving a torque from the holder body and is axially and radially displaceable relative to the holder body. Further, the tool holder has a positioning member fixedly disposed radially outwardly of the spindle and a casing disposed radially outwardly of the rotatable shaft such that the casing and the rotatable shaft are rotatable relative to each other. The casing is engageable with the positioning member for accurate positioning thereof by the positioning member, and thereby positioning the rotatable shaft, while the holder body is fixed to the spindle.

In such a tool holder, a rotary cutting tool is fixed to one end portion of the rotatable shaft. The rotatable shaft is positioned by the casing, which is accurately positioned by the positioning member disposed fixedly around the outer circumference of the free end of the machine spindle. Accordingly, a possible misalignment of the holder body with respect to the spindle will not affect a machining accuracy of the rotary cutting tool carried by the rotatable shaft. In other words, the accurate positioning of the casing permits high-precision machining, irrespective of the mounting accuracy of the holder body relative to the spindle.

However, there is a continuing requirement for further improvement in machining accuracy, particularly in reaming, fine-boring and other high-precision machining operations. Thus, there is a continuing demand for tool holders for rotary cutting tools for such machining operations, which contribute to further improvement in the machining accuracy.

SUMMARY OF THE INVENTION

It is accordingly an object of the present invention to provide a tool holder for rotary cutting tools, which is further improved over a tool holder as disclosed in the patent application previously identified, in terms of accuracy of machining by such rotary cutting tools.

According to the invention, there is provided a tool holder for holding a rotary cutting tool, attachable to a spindle of a machine tool for rotary cutting movement of the rotary cutting tool, comprising a holder body, a rotatable shaft, a positioning member, a casing, and a guide bushing.

The holder body is fixed to the spindle for rotation thereof about an axis of the spindle. The rotatable shaft is disposed concentrically with the holder body and has a tool-mounting portion at one end thereof to hold the cutting tool. The rotatable shaft is coupled at the other end portion of the holder body for receiving a torque from the holder body, such that the rotatable shaft is axially and radially displaceable relative to the holder body.

The positioning member is fixedly disposed radially outwardly of the spindle, and the casing is disposed radially outwardly of the rotatable shaft such that the casing and the rotatable shaft are rotatable relative to each other. The casing is engageable with the positioning member for accurate positioning thereof by the positioning member, and thereby positioning the rotatable shaft while the holder body is fixed to the spindle.

The guide bushing is fixedly supported at one axial end portion of the casing remote from the holder body, and has a bore which is engageable with an outer circumferential surface of a guide portion of the cutting tool held by the tool-mounting portion of the rotatable shaft, for rotatably guiding the cutting tool.

In the above arrangement, the rotatable shaft holding a rotary cutting tool is positionined by the casing which is accurately positioned by the positioning member. Accordingly, the rotatable shaft and the cutting tool are highly accurately aligned with respect to the spindle, irrespective of a possible mounting misalignment of the holder body with the spindle. Further, the cutting tool which is held at one end portion by the rotatable shaft, is rotatably guided or supported at its guide portion by the guide bushing fixedly supported at the free end of the casing remote from the holder body, such that the outer circumferential surface of the guide portion of the tool engages the inner surface defining the bore formed in the guide bushing. As a result, the rotary cutting tool is supported with high positioning accuracy through positioning functions of the guide bushing as well as of the casing, whereby the cutting tool is protected against otherwise possible run-out at the free or cutting end, which makes it possible to perform desired machining operations with significantly improved accuracy.

According to a preferred embodiment of the invention, the rotatable shaft comprises a first rotary member and a second rotary member which are concentrically connected to each other such that the two rotary members are not rotatable but axially movable relative to each other. The first rotary member is coupled to the holder body, and the second rotary member has the tool-mounting portion. Axial drive means is provided to move the second rotary member axially relative to the first rotary member, whereby the cutting tool is axially moved relative to the guide bushing while the tool is guided at its guide portion by the guide bushing.

In an advantageous form of the above preferred embodiment, the second rotary member includes a piston portion which cooperates with the casing to partially define a pressure chamber within the casing. The second rotary member is axially moved away from the first rotary member and the cutting tool is advanced toward the workpiece when a fluid pressure is applied to the pressure chamber.

In an advantageous arrangement of the above form of the invention, the casing and the positioning member have a first and a second abutment face, respectively, which abut on each other when the casing is brought into engagement with the positioning member upon mounting of the tool holder on the machine spindle. The casing has a first fluid passage communicating at its one end with the above indicated pressure chamber. This first fluid passage is open at the other end in the first abutment face of the casing. In the meantime, the positioning member has a second fluid passage which is open in a portion of the second abutment face opposite to said other end of the first fluid passage open in the first abutment face. The casing and the positioning member incorporate a first and a second shut-off valve, respectively, which are associated with the first and second fluid passages at the first and second abutment faces, respectively. The first and second shut-off valves close in the first and second fluid passages at the first and second abutment faces when the casing is not in engagement with the positioning member, i.e., when the tool holder is not mounted on the machine spindle. When the casing is put into engagement with the positioning member and the first and second abutment faces abut on each other, the first and second shut-off valves open the first and second fluid passages and bring the two fluid passages into communication with each other.

According to another preferred embodiment of the invention, the guide bushing has, at its one end, an annular flange portion which extends radially outwardly from an outer circumferential surface thereof. The free end portion of the casing has a fitting hole concentric with the rotatable shaft, and the outer circumferential surface of the guide bushing is slidably engageable with the fitting hole. The guide bushing is removably fixed to the free end of the casing with the annular flange portion forced against the end face of the casing by a fastening screw.

According to a further embodiment of the invention, the casing has an opening formed through a circumferential wall thereof between the opposite end portions thereof, so that the opening provides an access to the tool-mounting portion of the rotatable shaft to clamp the cutting tool to the tool-mounting portion.

According to a still further preferred embodiment of the invention, the guide bushing has at least one coolant delivery passage which is open in the bore of the bushing to supply a coolant to the cutting tool.

In one form of the above embodiment, the coolant delivery passage is connected to a first coolant feed passage formed in the casing. This first coolant feed passage is connected to and disconnected from a second coolant feed passage formed in the positioning member. The connection and disconnection of the first and second coolant feed passages are accomplished through a first and a second shut-off valve identical to the first and second shut-off valves previously discussed in association with the first and second fluid passages for axial movement of the second rotary member of the rotatable shaft.

According to an advantageous form of the rotatable shaft of the tool holder of the invention, the tool-mounting portion comprises a collet chuck to hold the cutting tool.

BRIEF DESCRIPTION OF THE DRAWING

The above and other objects, features and advantages of the present invention will be better understood from reading the following description of the preferred embodiment taken in connection with the accompanying drawing in which.

DETAILED DESCRIPTION OF THE PREFERRED EMBODIMENTS

Refering to the accompanying drawings, a preferred embodiment of the invention will be described in detail.

Figure 1:
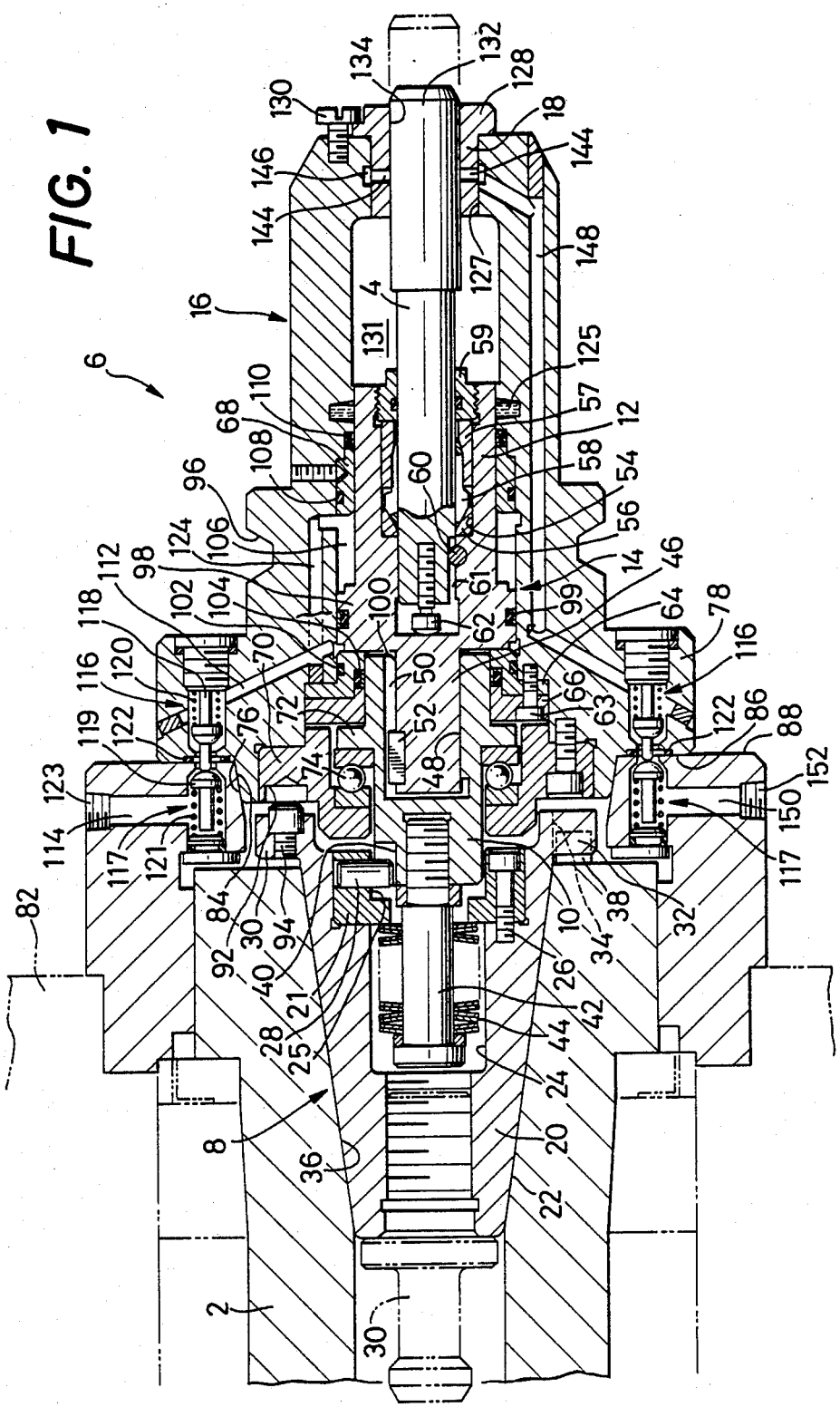
FIG. 1 is an elevational view in longitudinal cross section of one embodiment of a tool holder of the present invention for rotary cutting tools, which is mounted on a spindle of a machine tool.

In FIG. 1, reference numeral 2 designates a cylindrical spindle of a machining center, which is rotated about its axis. To a free end of the spindle 2 is attached a tool holder 6 of the invention for holding a reamer 4 as a rotary cutting tool. The tool holder 6 imparts rotary movements of the spindle 2 to the tool 4.

The tool holder 6 comprises: a holder body 8 removably fixed to the spindle 10; a rotatable shaft 14 which is disposed concentrically with the holder body 8 to hold the reamer 4 and which comprises a first rotary member 10 and a second rotary member 12 concentrically connected to each other such that the two rotary members 10, 12 are not rotatable but axially movable relative to each other to hold the reamer 4; a positioning member 80 fixedly disposed radially outwardly of the spindle; a casing 16 disposed radially outwardly of the rotatable shaft 14 for positioning the shaft 14; and a guide bushing 18 which is fixedly supported at one axial end portion of the casing 16 remote from the holder body 8. The first rotary member 10 of the rotatable shaft 14 is coupled to the holder body 8, and the second rotary member 12 has a tool-mounting portion to hold the reamer 4.

The holder body 8 consists of a shank member 20 and a ring-shaped torque member 21. The shank member 20 has an outer tapered surface 22 and an axial hole 24 of stepped diameters formed through a radially central portion of the shank member 20. The torque member 21 is received in the largest-diameter portion of the axial hole 24 and secured to the shank member 20 with bolts 26. A torque transmitting pin 28 is press-fitted in a radial hole formed in the torque member 21 so that one end of the pin 28 is protruded radially inwardly of the torque member 21 and located within a bore 25 formed through the torque member 21. A pull stud 30 is fixed to the small-diameter end portion of the holder body 8 such that the stud 30 extends from the small-diameter end face of the shank member 20 in the axial direction. The shank member 20 includes an annular flange portion 32 which protrudes radially outwardly from the outer circumference at its larger-diameter end, and perpendicularly to the axis of the shank member 20. The annular flange portion 32 has cutouts (key slots) 34 which receive or engage bosses (drive keys) 38 provided on the end face of the spindle 2, in order to prevent relative rotation between the spindle 2 and the holder body 8 when the shank member 20 has been sufficiently pulled into the spindle 2, that is, when the outer tapered surface 22 of the shank member 20 has come into close contact with an inner tapered surface 36 which defines a tapered bore (36) formed in the free end portion of the spindle 2.

The first rotary member 10 of the rotatable shaft 14 is of circular shape in transverse cross section, and an end portion of the first rotary member 10 on the side of the holder body 8 is axially slidably fitted in the bore 25 in the torque member 21, with a small radial clearance between the outer surface of the first rotary member 10 and the inner surface of the torque member 21. This end portion of the first rotary member 10 has an axial slot 40 in the outer circumferential surface, so that the slot 40 is parallel to the centerline or axis of rotation of the first rotary member 10. The previously indicated torque transmitting pin 28 engages the axial slot 40, whereby rotary movements of the holder body 8 are transmitted to the first rotary member 10. A bolt 42 is threaded to the center of the end portion of the first rotary member 10 engaging the torque member 21, such that the bolt 42 extends through the bore 25 and into the axial hole 24. The first rotary member 10 is biased toward the holder body 8 by Belleville or coned disk springs 44 which are disposed between the head of the bolt 42 and the torque member 21. Stated more specifically, the first rotary member 10 and the holder body 8 are coupled to each other so that they are axially movable or displaceable relative to each other against a biasing force of the springs 44, and so that the first rotary member 10 is radially displaceable relative to the holder body 8 because of the presence of the above indicated small radial clearance to the torque member 21, i.e., a small degree of inclination and radial displacement of the axis of the first rotary member 10 relative to the axis of the holder body 8 is possible.

The second rotary member 12 of the rotatable shaft 14 is a stepped-diameter shaft of circular shape in transverse cross section, and has a small-diameter portion 46 which extends toward the holder body 8. This small-diameter portion 46 is loosely fitted in a center hole 48 formed in the other end portion of the first rotary member 10 opposite to the previously indicated end portion to which the bolt 42 is fixed. The first rotary member 10 has a key slot 50 in the inner surface defining the center hole 48. The key slot 50 is formed parallel to the axis of the first rotary member 10. A key 52 is secured to the outer surface of the small-diameter portion 48 of the second rotary member 12. The key 52 slidably engages the key slot 50, whereby the first and second rotary members 10 and 12 are axially movable toward and away from each other while relative rotation therebetween is prevented.

The second rotary member 12 has a tool-insertion hole 54 of stepped diameters which is formed in the other end portion opposite to the small-diameter portion 46. The tool-insertion hole 54 has a small diameter at its bottom end, and a large diameter at its open end. In the large diameter portion of the hole 54, there are disposed two tapered rings 56, 57, and a collet 58, which cooperate to constitute a collet chuck to hold the reamer 4. The collet 58 is a generally cylindrical body having a plurality of slits which extend from one or the other end of the body alternately, parallel to the axis of the body. The collet 58 has tapered outer circumferential surfaces at the opposite end portions such that the diameter of the body decreases toward the ends. The tapered rings 56, 57 have tapered inner circumferential surfaces which are held in contact with the tapered outer circumferential surfaces of the collet 58. A clamp nut 59 is screwed in a tapped portion of the tool-insertion hole 54 adjacent to its open end. When the reamer 4 is mounted on the tool holder 6, the shank of the reamer 4 is inserted in the tool-insertion hole 54 through the clamp nut 59 and the collet 58, and the clamp nut 59 is screwed into the hole 54 to force the tapered ring 57 toward the tapered ring 56, whereby the collet 58 is elastically compressed in the radial direction to a reduced diameter, with a result of clamping the shank of the reamer 4 with a sufficient pressure. Thus, in this specific embodiment, the tool-insertion hole 54, tapered rings 56, 57 and collect 58 constitute a major part of the tool-mounting portion which comprises the collet chuck. A straight pin 60 is fixedly disposed in the tool-insertion hole 54 perpendicularly to the axis of the second rotary member 12. This straight pin 60 engages a flat 61 formed on the shank of the reamer 4, and thus prevents relative rotation between the second rotary member 12 and the reamer 4. Further, the shank of the reamer 4 carries at its end a stop 62 which is threaded so that it extends axially of the reamer 4. When the reamer 4 is inserted into the tool-insertion hole 54, the free end of the stop 62 abuts on the bottom wall of the hole 54, whereby the axial position of the reamer 4 relative to the second rotary member 12 is determined by the specific length of protrusion of the stop 62 from the end face of the shank of the reamer 4.

The previously indicated casing 16 is disposed radially outwardly of the rotatable shaft 14 which comprises the first and second rotary members 10 and 12 as discussed above. The casing 16 is adapted to position the rotatable shaft 14 such that the shaft 14 is rotatable relative to the casing 16. This casing 16 is of generally cylindrical shape having different outside diameters, and slidably engages the second rotary member 12 via a cylinder cover 64 and a bushing 66 which are both fixed to the casing 16. Further, the casing 16 has inner surfaces which are held in sliding contact directly with the outer surface of the second rotary member 12, or indirectly via a bushing 68, so that the second rotary member 12 is rotatable and axially movable relative to the casing 16. A bearing cap 70 is fixed to the open end of the casing 16 on the side of the holder body 8. This bearing cap 70 cooperates with the cylinder cover 64 and bushings 66, 68 to form an assembly which is movable with the casing 16, i.e., a part of the casing 16. A thrust bearing 74 is disposed between the bearing cap 70 of the casing 16, and a flange portion 72 of the first rotary member 10, which flange portion 72 extends radially outwardly from the outer circumferential surface of the first rotary member 10. This thrust bearing 74 is adapted to receive a thrust load from the first rotary member 10.

The casing 16 is provided, at its end to which the bearing cap 70 is fixed, with a tapered nose having a tapered outer circumferential surface 76 which is tapered such that the outside diameter decreases in a direction toward the nose end, i.e., toward the holder body 8. The casing 16 is further provided with an annular flange portion 78 which extends radially outwardly from the large diameter end of the tapered nose (76), perpendicularly to the axis of the casing 16.

The annular positioning member 80 is secured to a body 82 of the machining center so as to surround the free end portion of the spindle 2. The positioning member 80 has a tapered bore which is partially defined by a tapered inner circumferential surface 84. This tapered surface (tapered bore) 84 is complementary to the tapered outer circumferential surface 76 of the casing 16. In this arrangement, the tapered nose 76 of the casing 16 fits into the tapered bore 84 of the positioning member 80, that is, the outer and inner complementary tapered surfaces 76 and 84 are brought into contact with each other, when the holder body 8 is inserted into the tapered bore 36 in the spindle 2. With the tapered surfaces 76 and 84 contacting each other, an end face 86 of the annular flange portion 78 is held in abutting contact with an end face 88 of the positioning member 80. These end faces 86 and 88, which are perpendicular to the axis of the casing 16, serve as opposite abutment faces for axial positioning of the casing 16. Thus, the casing 16 is accurately positioned and fixed in both radial and axial directions by means of, and with respect to, the positioning member 80.

As previously indicated, the holder body 8 and the casing 16 are biased toward each other by the coned disc springs 44. Upon insertion of the holder body 8 into the spindle 2 in a manner which will be described, the casing 16 is first brought into contact with the positioning member 80. Then, the holder body 8 is slightly displaced axially against the biasing force of the springs 44 relative to the casing 16 when the holder body 8 inserted in the spindle 2 is pulled inwardly at the pull stud 30 by a draw bar (not shown). Stated the other way, the tapered surfaces 76 and 84 are brought into a slight interference fit with each other, with the abutment faces 86 and 88 abutting on each other, when the holder body 8 has been inwardly pulled by a small distance by the draw bar. Thus, the casing 16 is kept in pressed contact with the positioning member 80 with surface pressures produced by the biasing force of the coned disc springs 44 while the holder body 8 is installed in place in the spindle 2, i.e., after the tool holder 6 has been attached to the spindle 2.

The bearing cap 70 fixed to the casing 16 has recesses 92 in its end face opposite to the end face of the annular flange portion 32 of the shank member 20. In the meantime, the annular flange portion 32 is formed with engagement dogs 94 which are engageable with the corresponding recesses 92. These recesses 92 and engagement dogs 94 cooperate with the coned disc springs 44 to constitute a circumferential lock mechanism or means for preventing relative rotation between the holder body 8 and the casing 16. Stated in more detail, when the tool holder 6 is not mounted on the spindle 2, the engagement dogs 94 are held in engagement with the recesses 92 by the coned disc springs 44, whereby the holder body 8 and the casing 16 are circumferentially positioned relative to each other, and their relative rotation is prevented. When the tool holder 6 is mounted in place on the spindle 2, however, the holder body 8 is moved a slight distance away from the casing 16, and the engagement dogs 94 are disengaged from the recesses 92. Described in greater detail, the casing 16 has an annular groove 96 in its outer surface so that the tool holder 6 can be gripped at the annular groove 96 by a tool changer arm (not shown) of the machining center. In mounting the tool holder 6 onto the spindle 2, the tool holder 6 is moved by the tool changer arm so that the holder body 8 is inserted into the spindle 2 which has been oriented at its predetermined circumferential angular position. While the holder body 8 is inserted into the spindle bore 36, the cutouts 34 in the annular flange portion 32 of the shank member 20 engage the bosses or drive keys 38 on the spindle 2. Before the tapered outer circumferential surface 22 of the shank member 20 has been completely brought into contact with the tapered inner circumferential surface 36 of the spindle 2, the tapered surfaces 76 and 84 engage each other, and the abutment faces 86 and 88 abut on each other. Then, the holder body 8 is pulled at the pull stud 30 axially inwardly by the draw bar, until the shank member 20 completely fits in the tapered bore 36 in the spindle 2. During this inward movement of the holder body 8 with the pull stud 30, the holder body 8 is moved away from the casing 16 against the biasing force of the coned disc springs 44, and as a result the engagement of the dogs 94 with the mating recesses 92 is released, whereby the tool holder 6 is placed in its operative position at which the holder body 8 is rotatable relative to the casing 16.

The second rotary member 12 of the rotatable shaft 14 has, at an axially intermediate part thereof, a piston portion 98 which is larger in diameter than the remaining portion. The piston portion 98 is held in sliding contact with the inner circumferential surface of the casing 16, so that a part of the casing 16 serves as a cylinder in which the piston portion 98 is slidably movable in the axial direction of the second rotary member 12. A sealer ring 99 is provided on the piston portion 98 to maintain fluid tightness between the inner surface of the casing 16 and the outer surface of the pistion portion 98. On one side of the piston portion 98 axially of the second rotary member 12, there is formed a first pressure chamber 100 which is defined by the inner surface of the casing 16, cylinder cover 64, first rotary member 10, and other elements adjacent to the piston portion 98. Reference numerals 102 and 104 designate an O-ring and a sealer ring 104, respectively, which serve to maintain fluid tightness of the first pressure chamber 100. On the other side of the piston portion 98, there is formed a second pressure chamber 106 which is defined by the inner surface of the casing 16, bushing 68, and outer surfaces of the second rotary member 12. Reference numerals 108 and 110 designate an O-ring and a sealer ring, respectively, which maintain fluid tightness of the second pressure chamber 106.

To move the second rotary member 12 (piston portion 98) axially away from the first rotary member 10, a fluid pressure is applied to the first pressure chamber 100 through a fluid passage formed through the casing 16 and the positioning member 80. Stated more specifically, a first fluid passage 112 is formed in the casing 16, while a second fluid passage 114 is formed in the positioning member 80. The first fluid passage communicates at one end thereof with the first pressure chamber 100, and is open at the other end in the abutment face 86. The second fluid passage 114 is open at one end thereof in the abutment face 88. These two fluid passages 112 and 114 are formed so that they are connected to each other at the abutment faces 86 and 88 when the casing 16 is in engagement with the positioning member 80. The casing 16 and the positioning member 80 incorporate a first and a second shut-off valve 116, 117, respectively, which are associated with the open ends of the first and second fluid passages 112, 114 adjacent to the abutment faces 86, 88, respectively. The first and second shut-off valves 116, 117 include a first and a second valving member 118, 119, respectively, which are axially movable parallel to the axis of the casing 16. The valving members 118, 119 are biased by springs 120, 121 in such opposite directions that they cause the first and second fluid passages 112 and 114 to be closed at the open ends at the abutment faces 86, 88, when the casing 16 is not placed in engagement with the positioning member 80, i.e., when the tool holder 6 is not mounted on the spindle 2. In this condition, therefore, the fluid will not leak from the first and second fluid passaages 112, 114. The first valving member 118 of the first shut-off valve 116 has an axial projection which is abuttable on the opposite end of the second valving member 119 when the casing 16 is brought into engagement with the positioning member 80, that is, when the abutment face 86 of the casing 16 is brought into abutting contact with the abutment face 88 of the positioning member 80. In other words, when the tool holder 6 is mounted on the spindle 2, the first and second valving members 118, 119 are moved axially away from each other and away from the respective valve seats adjacent to the abutment faces 86, 88, against the biasing forces of the springs 120, 121, whereby the first and second fluid passages 112 and 114 are put into communication with each other at the abutment faces 86, 88. In this condition, the fluid tightness between the abutment faces 86, 88 is maintained by a sealing member 122 secured to the abutment face 86 of the casing 16. The second fluid passage 114 is connected to a pressure source via an external conduit (not shown) which is coupled to an inlet port 123 provided on the positioning member 80.

The second pressure chamber 106 is held in communication with a fluid passage 124 which is connected to another fluid passage (not shown) formed in the positioning member 80, through another set of shut-off valves 116, 117, when the casing 16 is put into engagement with the positioning member 80. Thus, a fluid pressure is applied to the second pressure chamber 106 so as to move the second rotary member 12 (piston portion 98) toward the first rotary member 10. Reference numberal 125 indicates a felt ring which serves to prevent entry of cutting chips or other foreign matters between the sliding surfaces of the second rotary member 12 and the casing 16.

As discussed above, axial drive means for axially moving the second rotary member 12 relative to the first rotary member 10 is constituted by the casing 16, piston portion 98, first and second pressure chambers 100, 106, first and second fluid passages 112, 114, first and second shut-off valves 116, 117, and other elements.

Figure 2:
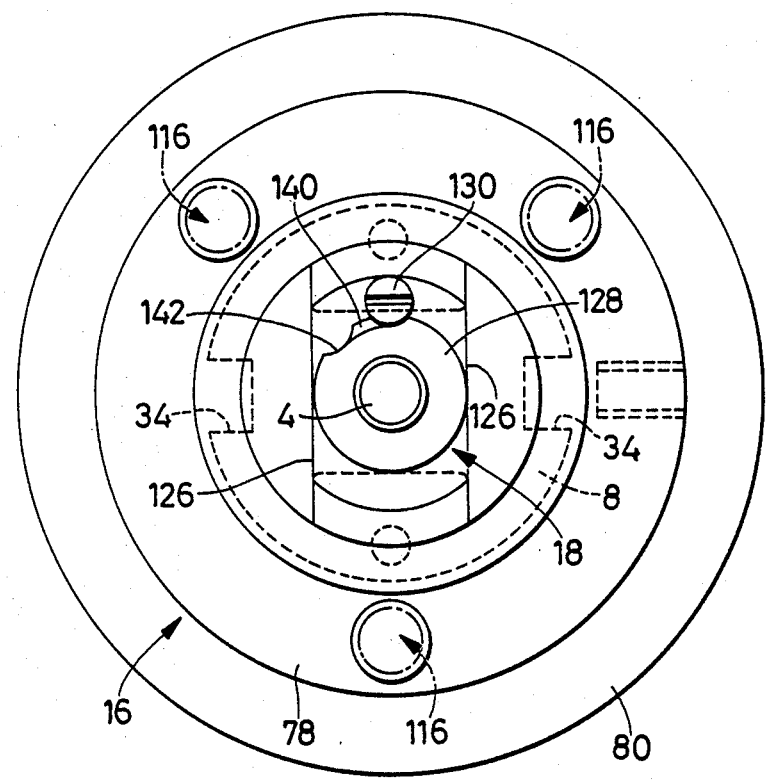
FIG. 2 is an elevational end view of the tool holder of FIG. 1, as seen from the right-hand side of the drawing sheet of FIG. 1.

The casing 16, which is a generally cylindrical member, is cut at an axial portion between the felt ring 125 and its free end, in two parallel planes parallel to the axis, so as to provide parallel cutouts 126 as indicated in FIG. 2. Since the depth of the cutouts 126 is greater than the wall thickness of the cylindrical wall of the casing 16, the casing 16 is provided with a pair of diametrically opposed openings 131 (FIG. 1) which are formed through the cylindrical wall. These openings 131 provide an access to the tool-mounting portion of the second rotary member 12, more particularly, to the clamp nut 59 for turning the clamp nut 59 with a suitable tool to clamp the reamer 4 at its shank with the collet chuck (56, 57, 58).

The free end portion of the casing 16 opposite to the end engageable with the positioning member 80, has an axial fitting hole 127 which is formed concentrically with the first and second rotary members 10, 12. The previously indicated guide bushing 18 is slidably fitted in this axial hole 127 in accurate alignment with the second rotary member 12. The guide bushing 18 has, at its one end, an annular flange portion 128 which extends radially outwardly from an outer circumferential surface thereof which engages the inner circumferential surface defining the axial fitting hole 127. The annular flange portion 128 is adapted to abut on the end face of the casing 16 when the guide bushing 18 is slidably inserted into the axial fitting hole 127. As described later in more detail, the guide bushing 18 is removably fixed to the casing 16 with a fastening screw 130 which is screwed into the end face of the casing 16 to force the annular flange portion 128 against the end face of the casing 16.

The guide bushing 18 has an inner circumferential surface 134 which engages a cutting portion 132 of the reamer 4 when the reamer 4 is held at its shank by the tool-mounting portion of the second rotary member 12. That is, the reamer 4 is axially and radially positioned and claimed at its shank portion by the second rotary member 12, while the reamer 4 is radially positioned and supported by the guide bushing 18 at its cutting portion 132 remote from the shank portion. Thus, the cutting portion 132 serves as a guide portion of the reamer 4 at which the tool is rotatably guided by the guide bushing 18. As previously discussed, the application of a fluid pressure to the first pressure chamber 100 will cause the second rotary member 12 to move away from the first rotary member 10 (from the holder body 8), thereby moving the reamer 4 so that the free end of the cutting portion 132 is projected from the end face of the guide bushing 18. On the other hand, the reamer 4 is retracted toward the holder body 8 by the second rotary member 12 when a fluid pressure is applied to the second pressure chamber 106. In these axial movements of the reamer 4, the guide bushing 18 acts to rotatably support and guide the reamer 4.

As shown in FIG. 2, the annular flange portion 128 of the guide bushing 18 is formed with a stepped area 140 along a portion of its circumference. This stepped area 140 is provided to engage the underside of the fastening screw 130. The annular flange portion 128 has an arcuate cutout 142 at the end of the stepped area 140. The arcuate cutout 142 allows the guide bushing 18 to be freed from the head of the fastening screw 130 when the arcuate cutout 142 is aligned with the head of the screw 130 by turning the guide bushing 18 to the appropriate circumferential position with the screw 130 loosened. With the arcuate cutout 142 aligned with the screw 130, the guide bushing 18 is axially movable in a direction away from the second rotary member 12, and thus readily removable from the casing 16.

The casing 16 and the guide bushing 18 are adapted to deliver a coolant to the cutting portion 132 of the reamer 4 during a cutting operation. Stated more specifically, the guide bushing 18 has plural coolant delivery passages 144 which are formed radially through the 5 cylindrical wall thickness, and spaced equiangularly from each other circumferentially of the bushing 18. These radial coolant delivery passages 144 are held in communication with an annular communication groove 146 formed in the inner circumferential surface of the casing 16 defining the bore 127. The communication groove 146 is connected to a coolant feed passage 148 formed through the casing 16. This coolant feed passage 148 is put into communication with another coolant feed passage 150 formed in the positioning member 80, when the casing 16 is brought into engagement with the positioning member 80. The casing 16 and the positioning member 80 incorporate another pair of shut-off valves 116, 117 adjacent to the abutment faces 86, 88, as previously described in connection with the first and second fluid passages 112, 114. The positioning member 80 is provided with an inlet port 152 which is connected to a coolant source via an external conduit. When the tool holder 6 is mounted on the spindle 2, the coolant feed passages 148 and 150 are put into communication with each other, whereby coolant is fed to the cutting portion 132 of the reamer 4 via the annular communication groove 146 and radial coolant delivery passages 144.

In mounting the tool holder 6 constructed as described hitherto, the holder body 8 is installed in the tapered bore 36 in the spindle 2 while the reamer 4 is held by the second rotary member 12 of the rotatable shaft 14. While the first and second rotary members 10, 12 of the rotatable shaft 14 are accurately fitted in the casing 16, the first rotary member 10 is radially displaceable relative to the holder body 8 to a small extent. Hence, the casing 16 is accurately positioned by the positioning member 80, without being affected by the mounting accuracy of the holder body 8 relative to the spindle 2. Since the rotatable shaft 14 is accurately positioned by the casing 16, the reamer 4 held by the second rotary member 12 of the rotatable shaft 14 is positioned with high accuracy, being substantially free from any adverse effects of possible misalignment of the holder body 8 with respect to the spindle 2 due to excessive wear of their mating surfaces, or due to accumulation of foreign matters on these mating surfaces.

When the holder body 8 inserted in the spindle 2 is pulled at the pull stud 30, a pulling force applied to the holder body 8 is transmitted to the casing 16 via the coned disc springs 44, bolt 42, first rotary member 10, thrust bearing 74, and bearing cap 70. As a result, the tapered outer circumferential surface 76 of the casing 16 is brought into pressed contact with the tapered inner circumferential surface 84 of the positioning member 80 under the biasing action of the coned disc springs 44, whereby the axis of the casing 16 is accurately aligned with the centerline of the spindle 2. Further, otherwise possible inclination of the axis of the casing 16 is prevented because the abutment face 86 of the annular flange portion 78 of the casing 16 is firmly held in pressed abutting contact with the abutment face 88 of the positioning member 80, at a radial position sufficiently distant from the axis of the casing 16. In this connection, it is noted that the positioning member 80 maintains its high positioning accuracy at its tapered surface 84 and abutment face 88, because the positioning member 80 is in service only when a high-precision machining operation is performed. In other words, the wear of those surfaces 84, 88 due to engagement with the tool holder 6 is held to a minimum because a commonly used tool holder is mounted on the spindle 2 without engagement with the positioning member 80, when the cutting operation to be performed does not require a particularly high machining accuracy. Accordingly, the casing 16 is positioned by the positioning member 80 with sufficiently high accuracy for a long time. For the reasons stated above, the reamer 4 is highly accurately positioned via the rotatable shaft 14 which is accurately positioned by the casing 16.

Further, the guide bushing 18 fixedly supported at the free end of the casing 16 enhances the positioning accuracy of the reamer 14 by rotatably supporting it at its cutting portion 132. Since the reamer 4 is supported by the tool-mounting portion of the second rotary member 12 and by the guide bushing 18, at two axially spaced positions, the alignment of the reamer 4 with the spindle 2 is accurately maintained, and particularly, otherwise possible run-out or radial deflection of the reamer at its cutting end is effectively prevented by the guide bushing 18.

With the tool holder 6 mounted on the spindle 2, a rotary motion of the spindle 2 is transmitted to the first rotary member 10 of the rotatable shaft 14 through engagement of the torque transmitting pin 28 with the axial slot 40, and then to the second rotary member 12 through engagement of the key 52 with the key slot 50. Thus, the reamer 4 held on the second rotary member 12 is rotated. In the meantime, the second rotary member 12 is advanced away from the first rotary member 10 with a fluid pressure applied to the first pressure chamber 100, whereby the reamer 4 is fed so that its cutting portion 132 is projected from the end face of the guide bushing 18 as indicated in broken line in FIG. 1. With the reamer 4 rotatably supported and axially fed as described above, an intended reaming operation is performed on a workpiece clamped at a predetermined position. Since the reamer 4 is supported or guided by the guide bushing 18 at its cutting portion 132 and its vicinity whose alignment with the spindle centerline has a great effect on the reaming accuracy, the reamer 4 can be driven with minimum run-out or radial deviation at its cutting end portion 132. Therefore, the tool holder 6 of the invention enables the reamer 4 to take a reaming cut with completely satisfactory accuracy.

To obtain an intended high reaming accuracy, it is generally practiced in the art to guide a reamer with a guide bushing which is fixed to a jig or fixture located relative to the workpiece to position the same. In this case, however, some measures should be taken to avoid an interference between such positioning jig or fixture and other tools such as drills. In this respect, the tool holder 6 according to the invention is advantageous in that the guide bushing 18 is carried on the tool holder 6 and consequently withdrawn from the workpiece together with the tool holder 6 when the tool holder 6 is removed from the spindle 2. That is, the guide bushing 18 will not interfere with other cutting tools used to machine the workpiece. This increases the freedom of workpiece setup and machining operations.

Upon removal of the tool holder 6 from the spindle 2, the holder body 8 is pushed axially outwardly of the spindle bore 36, with a hydraulic or other pressure via the pull stud 30. With this axial movement of the holder body 8, the annular flange portion 32 pushes the bearing cap 70 of the casing 16, whereby the press-fit of the casing 16 with the positioning member 80 is released.

While the present invention has been described in its preferred embodiment, it is to be understood that the invention is not limited thereto; but may be otherwise embodied.

For example, although the cutting portion 132 of the reamer 4 is used as a guide portion at which the reamer 4 is guided or supported by the guide bushing 18 in the illustrated embodiment, it is possible to provide the reamer 4, near its cutting portion 132, with an exclusively designed guide portion which is engageable with the guide bushing 18.

Further, it is appreciated that the rotatable shaft 14 consisting of the separate first and second rotary members 10 and 12 axially movable relative to each other could be replaced by an integrally formed rotatable shaft. In this instance, the reamer 4 is secured to the rotatable shaft such that the cutting portion 132 is projected from the guide bushing 18 by a distance necessary for an intended depth of reaming cut to be performed, and the reamer 4 is axially moved relative to the workpiece by moving the spindle 2 or the workpiece relative to each other, rather than hydraulically moving the reamer 4 relative to the tool holder 6 as in the illustrated embodiment. This alternative form of the invention does not require the previously discussed axial drive means which comprises the piston portion 98, first and second pressure chambers 100, 106, fluid passages 112, 114, etc.

While the illustrated embodiment of the tool holder 6 has been described in connection with the spindle 2 of a machining center, it is to be understood that the tool holder of the invention may be applicable to other types of machine tools such as boring and drilling machines, and special-purpose machines, which are equipped with a tool changing mechanism. Obviously, the tool holder 6 of the invention may accommodate other rotary cutting tools such as boring bars, in addition to the reamer illustrated in the drawing.

As a further modification, the tool-mounting portion of the tool holder using a mechanical collet chuck as in the illustrated embodiment may be replaced by a hydraulically operated chuck as disclosed in patent application serial number 625,690. Previously identified in the introductory part of the present application. Further, the circumferential lock mechanism between the holder body 8 and the casing 16 may be replaced by a mechanism as disclosed in the previously identified patent application. More particularly, a projecting pin may be disposed in the end portion of the casing 16 engageable with the positioning member 80. This pin is located a sufficient radial distance from the axis of the casing 16, and adapted to be slidably movable parallel to the axis of the casing 16. The pin is normally held by a biasing spring at its projected position at which the end of the pin is projected from the end face of the casing 16, and held in engagement with a recess formed in the holder body 8 while the tool holder 6 is not mounted on the spindle 2. In this projected position of the pin, the holder body 8 and the casing 16 are circumferentially locked to each other, and relative rotation therebetween is prevented. When the tool holder 6 is mounted on the spindle 2, the projecting pin on the casing 16 is brought into abutment on a stationary stopper member, whereby the pin is axially pushed to its retracted position away from the mating recess in the holder body 8, permitting the holder body 8 to rotate relative to the casing 16.

It is further possible that the casing 16 of the illustrated embodifment be modified to have a plurality of positioning pins parallel to the axis of the casing, as illustrated in FIG. 5 of the previously identified patent application. In this case, the positioning pins are adapted to fit in the corresponding holes formed in the positioning member, in order to position the casing with respect to the positioning member.

It will be obvious that other changes and modifications may occur to those skilled in the art in the light of the foregoing teachings, without departing from the scope of the invention defined in the appended claims.

What is claimed is:

1. A tool holder for holding a rotary cutting tool, attachable to a spindle of a machine tool for rotary cutting movement of the cutting tool, said spindle having a longitudinal axis about which it is rotatable, and said machine tool having a substantially stationary body, the holder comprising:

a holder body fixed to the spindle for rotation therewith about the axis of the spindle;

a rotatable shaft disposed concentrically with said holder body and having a tool-mounting portion at one end thereof to hold said cutting tool, said rotatable shaft being coupled at the other end portion thereof to said holder body for receiving torque from said holder body, said rotatable shaft being axially and radially displaceable and inclinable relative to said holder body;

a positioning member fixedly disposed on the machine tool body radially outwardly of said spindle;

a casing disposed radially outwardly of and rotatably engaged with said rotatable shaft such that said casing and said shaft are rotatable relative to each other, said casing being engageable with said positioning member for accurate positioning thereof by the positioning member, thereby flexibly connecting said rotatable shaft to said holder body while simultaneously accurately positioning said rotatable shaft with respect to said machine tool body when said holder body is fixed to said spindle; and a guide bushing fixedly supported at one axial end portion of said casing remote from said holder body, said guide bushing having a bore engageable with an outer circumferential surface of a guide portion of said cutting tool held by said tool-mounting portion of said rotatable shaft, for rotatably guiding the cutting tool.

2. A tool holder as claimed in claim 1, wherein said rotatable shaft comprises a first rotary member and a second rotary member concentrically connected to each other such that the two rotary members are not rotatable but are axially movable relative to each other, said first rotary member being coupled to said holder body, and said second rotary member having said tool-mounting portion, and wherein said tool holder further comprises axial drive means for axially moving said second rotary member and thereby axially moving said cutting tool relative to said guide bushing while said cutting tool is guided at said guiding portion by said guide bushing.

3. A tool holder as claimed in claim 2, wherein said second rotary member including further comprises a piston portion which cooperates with said casing to partially define a pressure chamber within said casing, said second rotary member being axially moved away from said first rotary member when pressurized fluid is applied to said pressure chamber.

4. A tool holder as claimed in claim 1, wherein said guide bushing has, at one end thereof, an annular flange portion extending radially outwardly from an outer circumferential surface thereof, and said one axial end portion of the casing has a fitting hole concentric with said rotatable shaft, said guide bushing being slidably engageable with said fitting hole at said outer circumferential surface thereof, and removably fixed to said one end portion of the casing with said annular flange portion forced against an end face of said one end portion by a fastening screw.

5. A tool holder as claimed in claim 1, wherein said casing has an opening formed through a circumferential wall thereof between said one axial end portion and an other end portion thereof, said opening providing access to said tool-mounting portion of said rotatable shaft to clamp said cutting tool to said tool-mounting portion.

6. A tool holder as claimed in claim 3, wherein said casing and said positioning member have a first and a second abutment face, respectively, which abut on each other when the casing and the positioning member engage with each other, said casing further having a first fluid passage commuciating at one end thereof with said pressure chamber and opening at the other end thereof in said first abutment face, said positioning member further having a second fluid passage opening in a portion of said second abutment face opposite to said other end of the first fluid passaage, said casing and said positioning member further having a first and a second shut-off valve, respectively, for controlling flow through said first and second fluid passages at said first and second abutment faces, respectively, said first and second shut-off valves closing said first and second fluid passages at said first and second abutment faces when said casing is not in engagement with said positioning member, but opening said fluid passages and bringing the fluid passages into communication with each other upon abutment of said first and second abutment faces when said casing is put into engagement with said positioning member.

7. A tool holder as claimed in claim 1, wherein said guide bushing has at least one coolant delivery passage which is open in said bore to supply a coolant to said cutting tool.

8. A tool holder as claimed in claim 7, wherein said casing and said positioning member have a first and a second abutment face, respectively, which abut on each other when the casing and the positioning member engage with each other, said casing further having a first coolant feed passage commumicating at one end thereof with said at least one coolant delivery passage and opening at the other end thereof in said first abutment face, said positioning member further having a second coolant feed passage opening in a portion of said second abutment face opposite to said other end of the first coolant feed passage, said casing and said positioning member further having a first and a second shut-off valve, respectively, for controlling flow through said first and second coolant feed passages at said first and second abutment faces, respectively, said first and second shut-off valves keeping said first and second coolant feed passage closed at said first and second abutment faces when said casing is not in engagement with said positioning member, but opening said coolant feed passages and bringing the coolant feed passages into communication with each other upon abutment of said first and second abutment faces when said casing is put into engagement with said positioning member.

9. A tool holder as claimed in claim 1, wherein said tool-mounting portion of said rotatable shaft comprises a collet chuck to hold said cutting tool.

10. A tool holder as claimed in claim 1, wherein said holder body comprises (a) a shank member which is engageable with a bore formed in said spindle, and which has an axial hole concentric with the shank member; and (b) a torque member for transmitting torque from said shank member to said rotatable shaft, said torque member having a central bore and being fixed in said axial hole of said shank member, said other end portion of the rotatable shaft extending in said central bore of said torque member with a slight radial clearance therebetween to allow a slight degree of inclination and radial displacement of an axis of said rotatable shaft with respect to an axis of said shank member.

11. A tool holder as claimed in claim 1, wherein biasing means is disposed between said holder body and said rotatable shaft to bias the holder body and the rotatable shaft toward each other along the axis of said rotatable shaft, said casing engaging said positioning member before said holder body has been fixed in place in said spindle, and said holder body being axially movable against a biasing force of said biasing means relative to said rotatable shaft so as to force said casing into said positioning member.

12. A tool holder as claimed in claim 10, wherein a bolt is fixed to said other end portion of the rotatable shaft extending into said axial hole in said shank member in an axial direction away from said other end portion and has a head portion at a free end thereof, and wherein biasing means is disposed between said head portion of said bolt and said torque member to bias said torque member and said rotatable shaft toward each other along the axis of the rotatable shaft, said holder body being axially movable by a slight distance against a biasing force of said biasing means away from said rotatable shaft after said casing has engaged said positioning member, whereby said casing is held in pressed engagement with said positioning member.

13. A tool holder as claimed in claim 1, further comprising biasing means for biasing said holder body and said casing toward each other along axes thereof, said casing and said positioning member having tapered surfaces which are complementary with each other, and further having opposite abutment faces which are perpendicular to the axis of said casing, said tapered surfaces engaging each other, and said abutment faces abutting on each other, with surface pressures produced by a resilient force of said biasing means after the holder body has been attached to said spindle, whereby said casing is positioned by said positioning member.

14. A tool holder as claimed in claim 1, wherein said casing further comprises an annular flange portion extending radially outwardly from an outer circumferential surface at one end of the casing opposite to said holder body, said annular flange portion having a cutout, and wherein said positioning member has a protrusion formed on an end face thereof which is engageable with said cutout in said annular flange portion of the casing when the tool holder is attached to said spindle, thereby to prevent relative rotation between said positioning member and said casing.

15. A tool holder as claimed in claim 1, wherein said tool-mounting portion of the rotatable shaft has a tool-insertion hole accommodating a shank of said cutting tool for fixation thereof to the rotatable shaft.

16. A tool holder as claimed in claim 1, further comprising a circumferential lock mechanism for locking said casing and said holder body to prevent relative rotation between said casing and said holder body when the tool holder is not attached to said spindle, and to allow said relative rotation after said tool holder has been attached to said spindle.

* * * * *